United States Patent
Rubitschung

[11] Patent Number: 6,095,492
[45] Date of Patent: Aug. 1, 2000

[54] VALVE FOR AN EXPLOSION PROTECTION APPARATUS

[75] Inventor: Christoph Rubitschung, Lampenberg, Switzerland

[73] Assignee: Rubitec AG, Bennwil, Switzerland

[21] Appl. No.: 09/270,406

[22] Filed: Mar. 16, 1999

[30] Foreign Application Priority Data

Mar. 17, 1998 [CH] Switzerland ............................... 636/98

[51] Int. Cl.[7] .............................................. F16K 7/07
[52] U.S. Cl. ............................................. 251/212; 251/7
[58] Field of Search ...................... 251/212, 4, 7

[56] References Cited

U.S. PATENT DOCUMENTS

| | | |
|---|---|---|
| 1,868,708 | 7/1932 | Hunt . |
| 2,917,927 | 12/1959 | Clark . |
| 3,214,156 | 10/1965 | Klose et al. . |
| 3,268,107 | 8/1966 | Sperling . |
| 3,831,318 | 8/1974 | Richmond . |
| 4,083,226 | 4/1978 | Eckstein et al. . |
| 4,322,054 | 3/1982 | Campbell et al. . |
| 4,372,528 | 2/1983 | Raftis ................................. 251/7 X |
| 4,800,920 | 1/1989 | Yusko, Jr. et al. ................ 251/4 X |
| 5,441,231 | 8/1995 | Payne et al. . |

FOREIGN PATENT DOCUMENTS

| | | |
|---|---|---|
| 0574128 | 12/1993 | European Pat. Off. . |
| 0728968 | 8/1996 | European Pat. Off. . |
| 0824027 | 2/1998 | European Pat. Off. . |
| 2234501 | 7/1975 | France . |
| 3617522 | 7/1987 | Germany . |
| 4316584 | 9/1994 | Germany . |
| 440894 | 1/1968 | Switzerland . |
| 685134 | 3/1995 | Switzerland . |

Primary Examiner—Kevin Lee
Attorney, Agent, or Firm—Selitto & Associates

[57] ABSTRACT

A valve (1) for an explosion protection apparatus comprises a pipe element having a pipe wall (11). Two slides (15, 15') can be pushed from the outside into the pipe element, through in each case one opening (111, 111') in the pipe wall (11). An expandable diaphragm (14) is arranged on the inside of the pipe wall (11) and forms an inner pipe which can be closed by means of the slide (15, 15') by mutually opposite diaphragm regions being pressed against one another. The expandable diaphragm which forms an inner pipe does not provide any accretion points for solid particles of product-loaded gas flow to collect on.

15 Claims, 2 Drawing Sheets

VALVE FOR AN EXPLOSION PROTECTION APPARATUS

FIELD OF THE INVENTION

The present invention relates to a valve for an explosion protection apparatus.

BACKGROUND OF THE INVENTION

Such valves are used, for example, in explosion protection apparatuses in industrial systems where there is an explosion risk, for automatically preventing the penetration of pressure waves and/or flames from a system part where there is an explosion risk into an adjacent system part. In the case of explosion protection apparatuses, it is of critical importance that, when necessary, the passageway between two system parts, in general a transport pipe, is closed, sealed, as quickly as possible. The closing process must be completed before pressure waves and/or flames arrive at the closing point. To this end, a closing element is moved at high speed to the passageway to be closed, and is braked quickly on reaching the closed position.

EP-A-0 824 027 describes an explosion protection apparatus having a valve which has a pipe element with an opening in the wall, through which opening a slide can be pushed, from the outside, as a closing element into the pipe element which, in the closed position, closes the passageway. This valve is particularly suitable for transport pipes through which gases flow. If the gas flows are loaded with solid products, then there is a risk of solid particles collecting in the closing region which, on the one hand, can lead to the closure not being sealed and, on the other hand, contaminates the valve, which often means that costly cleaning is necessary when a product change takes place.

OBJECTS OF THE INVENTION

With regard to the disadvantages of the already known valves which have been described above, the invention is based on the following object. The aim is to provide a valve for an explosion protection apparatus of the type mentioned initially, which is even suitable for use with product-loaded gas flows, and which ensures sealed closure at any time.

Preferred design variants result from the dependent patent claims. Patent claims 12 and 13 define an explosion protection apparatus having such a valve, as well as an application, as claimed in the invention, of said valve.

SUMMARY OF THE INVENTION

The essence of the invention is that, in a valve for an explosion protection apparatus, an expandable diaphragm is arranged on the inside of the wall of a pipe element and forms an inner pipe which can be closed by mutually opposite diaphragm regions being pressed against one another. At least one slide, which can be pushed into the pipe element from the outside through an opening in the pipe wall, is provided in order to press the diaphragm regions against one another.

The expandable diaphragm, which forms an inner pipe, offers no accretion point for solid particles of a product-loaded gas flow to collect on. The valve is thus scarcely contaminated, and sealed closure is possible at any time.

In the case of a preferred design variant, the valve comprises two mutually opposite, flat slides which can be moved toward one another. These two slides may have planar end surfaces whose shape is independent of the pipe wall interior and which, when they close, pinch the inner pipe between them. Since two slides are used, the distance which has to be traveled by each slide during the closing process can also be halved, by which means the closing time is reduced.

In the case of another advantageous design variant, the valve comprises a flat slide whose end part is formed to be essentially complementary to the part of the pipe wall interior opposite it. This valve has the advantage that it requires only one slide drive, can be constructed relatively easily, and is cost-effective.

A flange for attaching the pipe element to a pipe of an industrial system is preferably provided at least at one end of the pipe element of the valve as claimed in the invention, and the expandable diaphragm extends over a part of the flange exterior, where it acts as a seal between the valve flange and the pipe flange. The expandable diaphragm thus carries out not only a closing function but also a sealing function and is firmly clamped by the flange joint between the pipe and the pipe element.

In the case of a preferred design variant, the expandable diaphragm is designed to be thicker in the two edge regions and in the diaphragm regions which can be pressed against one another than in the diaphragm regions located in between. The thinner diaphragm regions form weak bursting points which are not so severely loaded as long as no explosion occurs, while the thicker edge regions are designed for attaching the diaphragm to the pipe element, and the thicker diaphragm regions that can be pressed against one another are designed as attachment points for the slide or slides, and for sealed closure.

The expandable diaphragm preferably has annular beads on both sides of the slide or slides, which annular beads point toward the pipe wall and ensure that, even after possible bursting of the diaphragm, the diaphragm regions which are pressed against one another close the inner pipe. The annular beads prevent the diaphragm regions which are pressed against one another from sliding out between the two slides or between the slide and the pipe wall.

The space between the pipe wall and the expandable diaphragm is advantageously sealed and is provided with a vacuum-pressure connection. The valve may be used even if gas flows at a reduced pressure through the pipe in which it is installed. To do this, an even lower vacuum pressure is just produced in the said space, so that the diaphragm is not sucked inward by the gas flowing through.

BRIEF DESCRIPTION OF THE DRAWINGS

The valve as claimed in the invention and the explosion protection apparatus as claimed in the invention will be described in more detail in the following text using two exemplary embodiments and with reference to the attached drawing, in which:

DETAILED DESCRIPTION OF THE PREFERRED EMBODIMENT

FIG. 1

Figure 1:
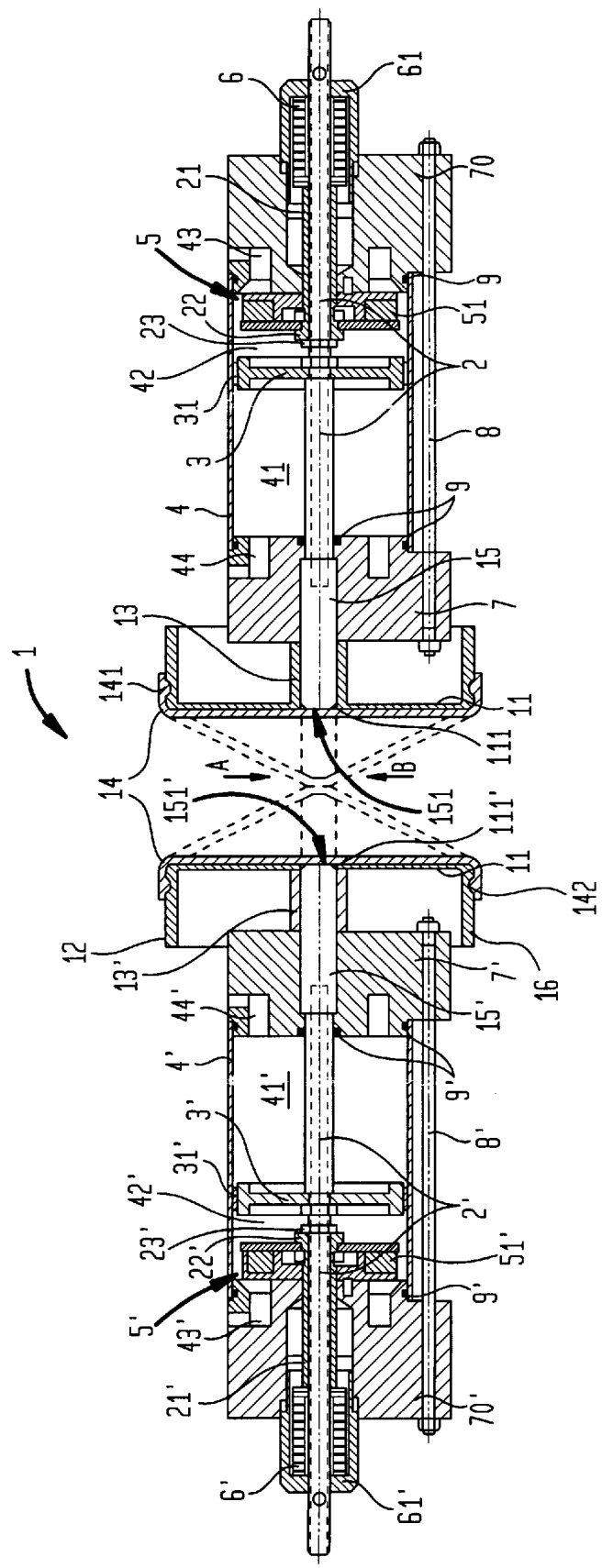
FIG. 1 shows a section through an explosion protection apparatus as claimed in the invention, having a valve with a first exemplary embodiment of an expandable diaphragm, and with two mutually opposite, flat slides.

The illustrated explosion protection apparatus comprises a valve 1 having a pipe element with a pipe wall 11, to each of whose two ends a flange 12 or 16, respectively, is fitted, in this case being welded. An expandable diaphragm 14, which forms an inner pipe, extends over the inside of the pipe wall 11 and over a part of the respective outside of the two flanges 12, 16. The diaphragm regions which rest against the two flanges 12, 16 are each provided with an annular bead 141 or 142, respectively, which are held by annular recesses in the flanges 12 and 16, respectively. In this way, the expandable diaphragm 14 is fitted quite firmly against the pipe element.

The valve 1 can be attached to a pipe of an industrial system, for example, by means of the flanges 12, 16. In this case, the expandable diaphragm 14 is clamped firmly between the valve flange and the pipe flange, and is at the same time used as a seal.

Opposite regions of the expandable diaphragm 14 can be pressed away from the pipe wall interior and toward one another by means of two slides 15 and 15'. In the position where they are pressed together, as is illustrated by a dashed line, the expandable diaphragm 14 closes the passageway through the pipe element, so that neither pressure waves nor flames can pass, to be precise in neither of the two directions A, B. The valve may also be closed and opened slowly, and may thus also be used as a shut-off device.

The expandable diaphragm 14 is composed, for example, of rubber, in particular silicone rubber, which can be pinched without breaking. It is advantageous to use a rubber which is approved for use in contact with foodstuffs. The thickness of the expandable diaphragm 14 is between 2 and 10 mm, preferably between 3 and 5 mm. The diaphragm may also have fabric reinforcement.

The two slides 15, 15' are designed to be relatively flat and have a width which corresponds roughly to the internal diameter of the pipe element. Their mutually opposite end surfaces 151 and 151', respectively, are essentially planar with rounded edges, in order to avoid damaging the expandable diaphragm 14. The slides 15, 15' can be pushed into the pipe element through openings 111 and 111' in the form of slots, in the pipe wall 11. Slide guides 13 and 13' are fitted, in this case welded, to the pipe wall 11 in order to guide the slides 15, 15'.

The slides 15, 15' are driven in a conventional manner, for which there are many different possibilities, in principle. EP-A-0 824 027 describes various slide movement mechanisms and triggering devices, which allow very short closing times without using a pyrotechnic detonator.

In the present exemplary embodiment, the slides 15, 15' are fitted to piston rods 2, 2', to which pistons 3, 3' are attached. The pistons 3', 3' are mounted such that they can move in cylinders 4, 4', with annular seals 31, 31' being arranged at the periphery of the pistons 3, 3' and ensuring a seal between the pistons 3, 3' and the cylinder inner wall. The interior of the cylinder 4, 4' is divided by the pistons 3, 3' respectively into a first chamber 41, 41' and a second chamber 42, 42'.

The piston rods 2, 2' are prestressed toward the expandable diaphragm 14 by means of compressed springs 6, 6', which are mounted in spring housings 61, 61'. The springs 6, 6' press sleeves 21, 21', which are arranged around the piston rods 2, 2', against annular heads 22, 22' which rest against annular plates 23, 23' that are connected firmly to the piston rods 2, 2', and thus produce a prestressing force. This prestressing force can be increased, if desired, by producing a pressure in the second chambers 42, 42' that is higher than that in the first chambers 41, 41'. This can be achieved using a compressed-gas supply, via gas channels 43, 43', from compressed-gas reservoirs which are not illustrated, but are arranged around the cylinders 4, 4'.

Triggering devices 5, 5' are fitted in fixed positions in the second chambers 42, 42' and, as long as current is supplied to annular electromagnets 51, 51' these annular electromagnets 51, 51' electromagnetically attract the annular plates 23, 23', which are firmly connected to the piston rods 2, 2', and hold them in the illustrated position. The current is supplied by electrical cables (which are not shown here) and is controlled by an explosion-identification sensor of a known type, in particular a pressure or infrared sensor, which is arranged in an adjacent system part where there is an explosion risk, or is connected to such a system part.

If the current supply is interrupted, the electromagnets 51, 51' lose their attraction force, and the slides 15, 15' are moved to the closed position via the piston rods 2, 2', by the springs 6, 6' and, possibly, by the increased pressure in the second chambers 42, 42' in comparison with that in the first chambers 41, 41', in which closed position the expandable diaphragm 14 completely closes the passageway through the pipe element. If an increased pressure in the second chambers 42, 42' is used, the compressed-gas reservoirs which are connected to them ensure that the increased pressure is maintained throughout the entire movement of the piston rods 2, 2' and pistons 3, 3'.

In order to move the slides 15, 15' and piston rods 2, 2' etc. back to their original position after the valve 1 has been closed, and to prestress them again, an increased pressure in comparison with that in the second chambers 42, 42' is produced in the first chambers 41, 41' by supplying compressed gas via gas channels 44, 44', which increased pressure is sufficient to compress the springs 6, 6'.

In order to withstand the pressures that occur, various housing parts 7 and 70, as well as 7' and 70', of the explosion protection apparatus are held together by means of tie bars 8, 8'.

Various annular seals are denoted by 9 and 9'.

FIG. 2

The illustrated second exemplary embodiment of an expandable diaphragm 214 comprises two edge regions 217 and 218, diaphragm regions 221 which can be pressed against one another, and two intermediate diaphragm regions 219 and 220. At one of their ends, the edge regions 217 and 218 have a part which extends outward with an annular bead 241 or 242, respectively, for attachment to the pipe element. Annular beads 222 and 223 are arranged on the diaphragm regions 221 which can be pressed against one another, which annular beads 222 and 223 point outward and, when the valve is closed, prevent the diaphragm regions 221 which are pressed against one another from sliding out between two slides or between a slide and the pipe wall. The diaphragm is thinner in the regions 219 and 220 than in the edge regions 217, 218 and in the diaphragm regions 221 which can be pressed against one another, so that the regions 219, 220 form weak bursting points.

FIG. 3

Figure 2:
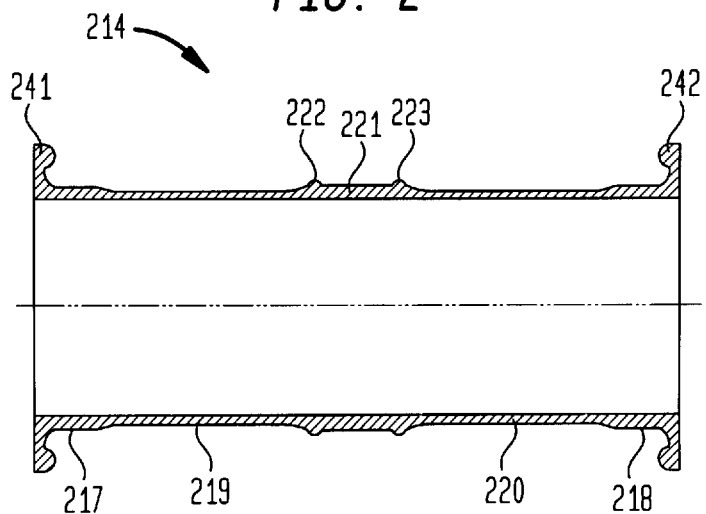
FIG. 2 shows a section through a second exemplary embodiment of an expandable diaphragm.
Figure 3:
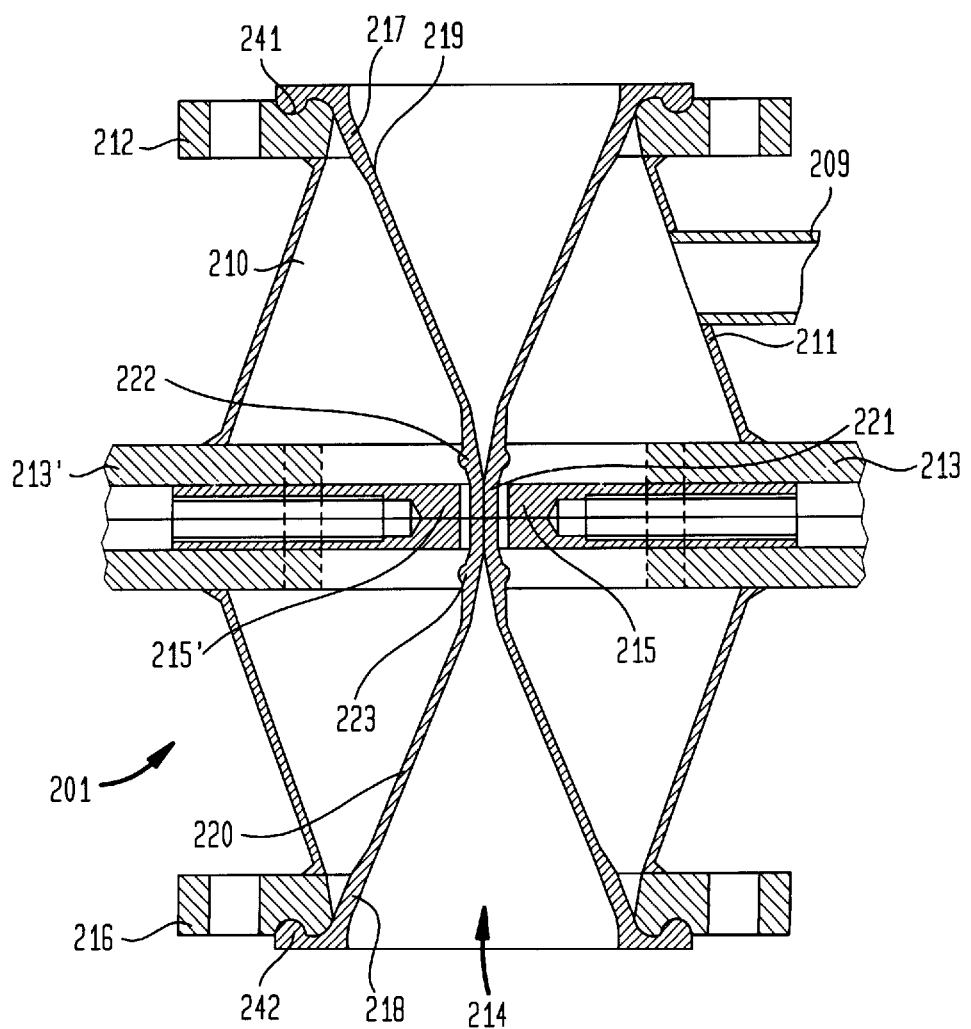
FIG. 3 shows a section through a second exemplary embodiment of the valve as claimed in the invention, with the expandable diaphragm as shown in FIG. 2.

The illustrated valve 201 comprises a pipe element having a pipe wall 211, to each of whose two ends a flange 212 or 216, respectively, is fitted, in this case welded. The expandable diaphragm 214, which has been explained in conjunction with FIG. 2, forms an inner pipe and extends on the inside of the pipe wall 211 and over a part of the respective outside of the two flanges 212, 216. The annular beads 241 and 242, respectively, of the diaphragm 214 are held by annular recesses in the flanges 212 and 216, respectively. In this way, the expandable diaphragm 214 is fitted quite firmly to the pipe element.

In this exemplary embodiment as well, the valve 201 can be attached by means of the flanges 212, 216, for example, to a pipe of an industrial system. In this case, the expandable diaphragm 214 is clamped firmly between the valve flange and the pipe flange, and is at the same time used as a seal.

Opposite regions 221 of the expandable diaphragm 214 can be pressed against one another by means of two slides 215 and 215', respectively. Slide guides 213 and 213' are fitted, in this case welded, to the pipe wall 211 in order to guide the slides 215, 215'.

The space 210 between the pipe wall 211 and the expandable diaphragm 214 is sealed and is provided with a vacuum-pressure connection 209, via which a vacuum pressure can be produced in the space 210, so that gas at reduced pressure can also flow through the valve 201 without the diaphragm being sucked inward by the gas flowing through.

Other design variations of the valve and explosion protection apparatus described above are feasible. It should expressly be mentioned here that the valve as claimed in the invention can also be used in explosion protection apparatuses having triggering devices which comprise a pyrotechnic detonator.

What is claimed is:

1. A valve for an explosion protection apparatus, having a pipe element and at least one slide which can be pushed into the pipe element from the outside through an opening in a wall of the pipe element, comprising sealing means, including an expandable diaphragm arranged on the inside of the pipe wall and forming an inner pipe; pressing means, including said at least one slide, for pressing a portion of said diaphragm against an opposite portion of said diaphragm to thereby close said inner pipe; and vacuum forming means, in communication with a space between the pipe wall and said diaphragm, for forming a vacuum in said space.

2. The valve as claimed in claim 1, wherein said pressing means includes two mutually opposite flat slides mounted for movement toward and away from one another.

3. The valve as claimed in claim 1, wherein each slide has an end part which is formed to be essentially complementary to an interior part of the pipe wall opposite thereto.

4. The valve as claimed in one of claims 1 to 3, wherein each slide moves through a corresponding slot-like opening in the pipe element.

5. The valve as claimed in claim 2, further comprising guiding means for guiding said slides as they move toward and away from one another.

6. The valve as claimed in claim 1, wherein said diaphragm extends over a flange of the pipe element and acts as a seal between the flange and the pipe.

7. The valve as claimed in claim 1, wherein said diaphragm is composed primarily of rubber.

8. The valve as claimed in claim 1, wherein said diaphragm has a thickness of between 2 and 10 mm.

9. The valve as claimed in claim 1, wherein said diaphragm has central and outer regions which are thicker than an intermediate region disposed therebetween.

10. The valve as claimed in claim 1 or 9, wherein said diaphragm includes annular beads projecting outwardly toward the pipe wall to ensure that, even after possible bursting of said diaphragm, the diaphragm regions are pressed against one another to close the inner pipe.

11. The valve as claimed in claim 7, wherein said diaphragm is composed of silicone rubber.

12. The valve as claimed in claim 7, wherein said diaphragm is composed of a material approved for use in contact with foodstuffs.

13. The valve as claimed in claim 7, wherein said diaphragm includes a fabric lining.

14. The valve as claimed in claim 1, wherein said diaphragm has a thickness of between 3 mm and 5 mm.

15. An explosion protection apparatus in an industrial system where there is an explosion risk, for automatically preventing the penetration of pressure waves and/or flames from a system part where there is an explosion risk into an adjacent system part, having a valve as claimed in one of claims 1 to 11.

* * * * *